March 27, 1962     H. R. NIELSEN     3,027,209
ADJUSTABLE LEG UNITS
Filed July 28, 1959     2 Sheets-Sheet 1

INVENTOR;
HAROLD R. NIELSEN.

BY Robert M. Dunning

ATTORNEY

March 27, 1962    H. R. NIELSEN    3,027,209
ADJUSTABLE LEG UNITS
Filed July 28, 1959    2 Sheets-Sheet 2
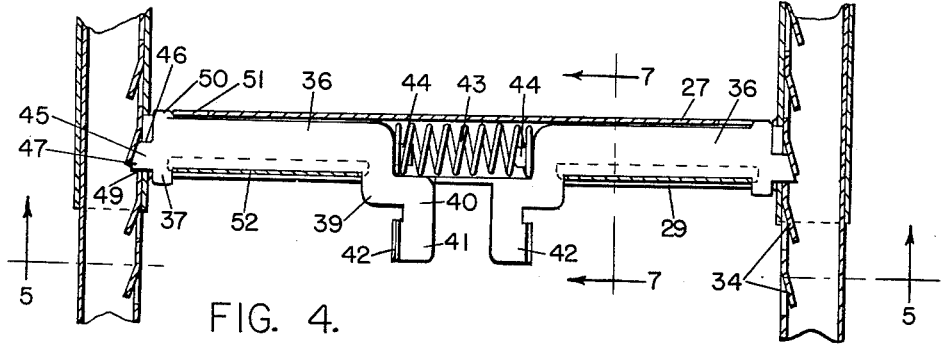
FIG. 4.
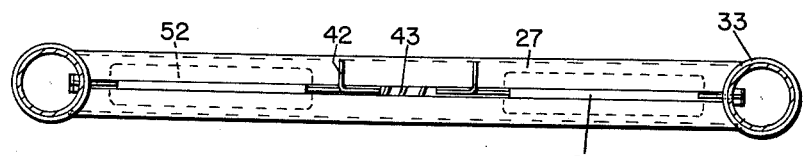
FIG. 5.
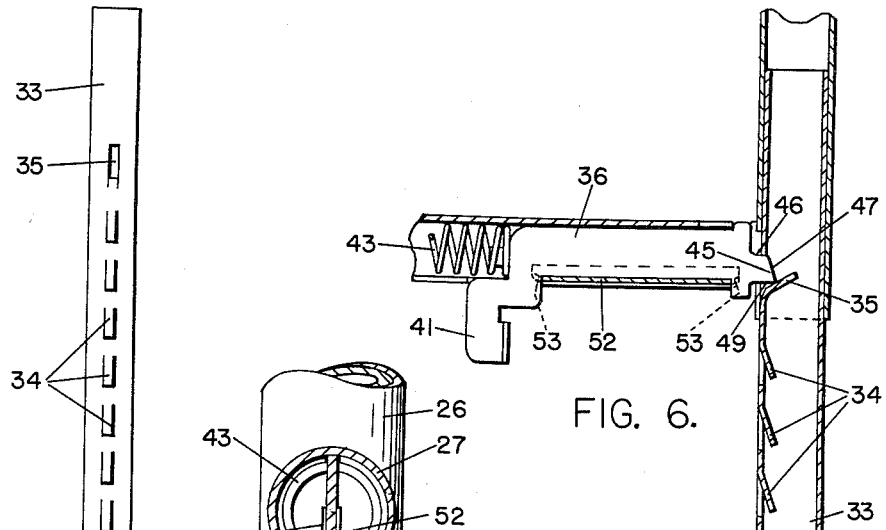
FIG. 6.
FIG. 7.
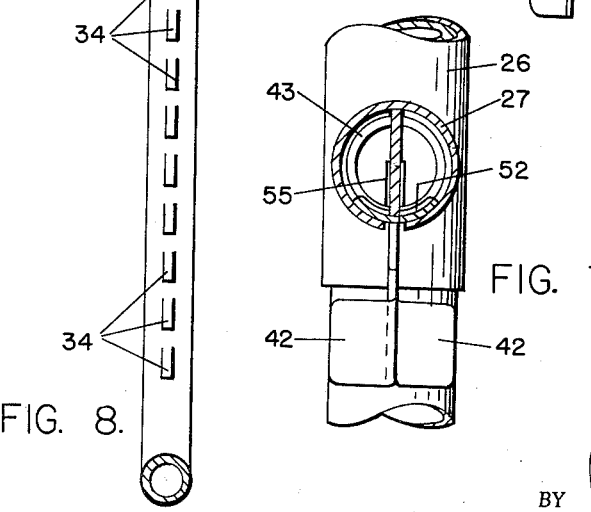
FIG. 8.
INVENTOR;
HAROLD R. NIELSEN.
BY Robert M. Dunning
ATTORNEY ID
3,027,209
ADJUSTABLE LEG UNITS
Harold R. Nielsen, Mendota, Minn.
Filed July 28, 1959, Ser. No. 830,123
7 Claims. (Cl. 311—95)

This invention relates to an improvement in adjustable leg units and deals particularly with a leg unit designed to support the end of a table or similar object and which is adjustable in height.

In the production of tables of the general type used in schools, churches and various public buildings, it is often desirable to vary the height of the table. As an example, tables which are designed for use in schools are often used by children of different ages and the adjustability of the table top is desirable so that a supply of tables of different heights need not be purchased. As tables of this type have become very competitive from a price standpoint, it is essential that the structure be simple and inexpensive. At the same time, it is necessary that the leg adjusting means be easily operated as they are used by a wide variety of persons. It is an object of the present invention to provide a simple means of adjusting table legs so that the tables can be produced at a price which will be competitive.

A feature of the present invention resides in the provision of a table leg unit which includes an upper pair of tubular members arranged for connection with the table top, and a pair of lower tubular members which are connected in parallel relation and which provide floor engaging means. The lower tubular members are supported in telescoping relation with the upper tubular members. Blocking means are provided for holding the telescoping members in a desired relationship. The locking means is so arranged that upward adjustment may be obtained by merely lifting the upper portion of the leg unit relative to the lower portion thereof, the two portions of the leg unit telescoping apart and automatically locking as the upper section begins downward movement relative to the lower portion. When a downward adjustment of the table top is desired, the locks may be readily operated to permit the telescoping of the two leg unit portions together.

A further feature of the present invention resides in the provision of locks which are formed of inexpensive sheet metal parts which may be stamped out at low cost. One such lock is provided for each pair of telescoping members. The locks are slidably supported for transverse movement in a tubular connecting member connecting the lower ends of the upper tubular members. The locks are urged into locking position by a spring positioned between the locks to urge them apart. Handle means are provided on the lock which project through a slot in the tubular member by means of which the two locks may be simultaneously grasped and drawn together.

A feature of the present invention resides in the provision of sheet metal locks which are similarly constructed and which accordingly may be produced with the same die. As a result, the cost of production is further reduced.

A feature of the present invention resides in the sliding support which holds the locks from twisting or turning in the tubular supports. A handle and a projecting ear projects through a slot on one side of the tube, the slot extending throughout the length of the tube. An ear is provided projecting through a short slot extending into the end of the tube diametrically opposite the first slot. As a result, the locks are positively held from twisting movement.

A further feature of the present invention resides in the provision of a novel means for limiting the separation of the upper and lower sections as the two portions are telescoped apart. The locks function automatically and are retracted by a cam action as the two portions are telescoped apart. When the two sections reach the limit of their extension, the locks automatically engage shoulder means which prevent complete separation of the sections unless the locks are manually retracted. Thus the upper leg section cannot be disengaged from the lower leg section accidentally.

A further feature of the present invention resides in a novel means of supporting and mounting the leg unit and in connecting the leg unit to the table top.

These and other objects and novel features of the present invention will be more clearly and fully set forth in the following specification and claims.

In the drawings forming a part of the specification:

FIGURE 4 is a vertical sectional view through the telescoping portions of the leg unit showing the general arrangement of parts.

FIGURE 5 is a horizontal sectional view through the leg unit looking upwardly at the lock structure.

FIGURE 6 is a vertical sectional view through a portion of the leg unit showing the upper and lower sections in fully extended position.

FIGURE 7 is a cross sectional view through the cross connecting member supporting the locks, the position of the section being indicated by the line 7—7 of FIGURE 4.

FIGURE 8 is an elevational view of one of the tubular portions of the lower leg section.

Figure 1:
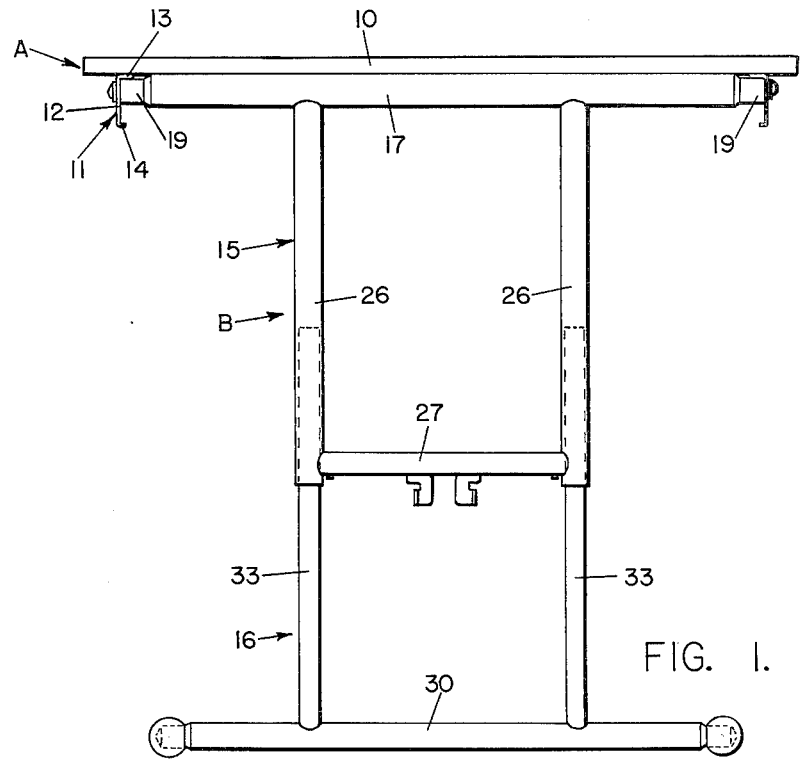
FIGURE 1 is an end elevational view of a leg unit showing the construction thereof.

The table A illustrated in the drawings includes a table top panel 10 which is supported and reinforced by a rectangular frame 11 of channel shaped cross section. The base of each channel shaped frame member is indicated at 12 and is arranged on a vertical plane. The top horizontal flange 13 is in face contact with the bottom of the table top panel 10 while the bottom flange 14 extends inwardly in spaced parallel relation to the top flange. The table top is supported by two leg units B one of which is positioned near each end of the table top. As the two leg units are identical, only one such leg unit is illustrated. The leg units B are foldably connected to the top of the table A and may fold from substantially vertical position to a position within the channel shaped frame members 11. Conventional brace means are provided for holding the leg units in vertical position. As these brace means are commonly used and form no part of the present invention, they are not disclosed in the drawings.

Figures 2, 3:
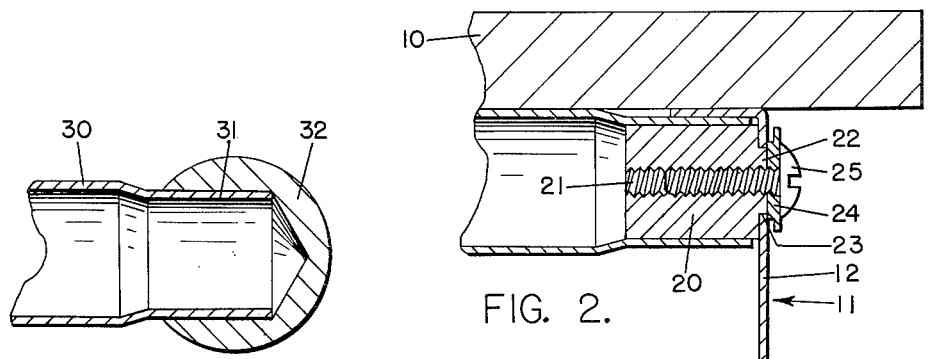
FIGURE 2 is a sectional view through the pivotal connection between the leg unit and the table top.
FIGURE 3 is a sectional view through an end of the lower leg unit disclosing the manner in which the leg unit is supported upon the floor.

The leg unit B includes an upper section which is indicated in general by the numeral 15 and a lower section which is indicated in general by the numeral 16. The upper leg section includes a tubular cross member 17 designed to bear against the table top 10 and having ends 19 which are of restricted or slightly smaller diameter. As indicated in FIGURE 2 of the drawings, a metal plug 20 having a threaded axial passage 21 extending therethrough is secured to the channel frame 11 at each side of the frame to support each leg unit. The plug 20 is provided with a projecting cylindrical portion 22 which extends through an opening 23 in the base 12 of each channel. The plug is held in place by a lock washer 24 held against the channel by a bolt or rivet 25 extending into the opening 21.

The plugs 20 serve as bearings for supporting the ends of the cross member 17. As a result, the leg units may be folded up within the channel shaped sides of the frame members 11.

A pair of spaced parallel tubular members 26 extend downwardly from the cross member 17 and are welded or otherwise secured at their upper ends to the cross member. A cross connecting member 27 connects the lower ends of the tubular members 26. As indicated in FIGURE 5 of the drawings, the cross connecting member 27 is slotted throughout its length as indicated at 29. The cross connecting member supports the locking mechanism which will be later described in detail.

The bottom section 16 includes a cross connecting member 30 to which are welded a pair of tubular members 33 which are of sufficiently smaller diameter than the tubular members 26 to fit into the tubular members 26 with a telescoping fit. As indicated in FIGURE 3 of the drawings, the ends of the cross connecting member 30 are provided with portions 31 of slightly smaller diameter than the remainder of this member. Spheres 32 having axial sockets thereon are pressed onto the ends of the smaller diameter end portions 31 and serve as floor engaging members. Due to the spherical shape of the members 32, the table may be readily moved from place to place.

As indicated in FIGURES 4, 6 and 8 of the drawings, each of the tubular members 33 extending upwardly from the cross connecting member 30 are provided with a series of vertically spaced ears 34 which are bent at their upper ends to incline downwardly and inwardly toward the center of the tubular leg 33. At the upper extremity of the series of ears 34 a single ear 35 is provided which is bent inwardly and upwardly from its lower end at a substantially greater angle from the vertical than the ears 34. The purpose of this arrangement will be later clarified.

A pair of identical locks 36 are slidably supported in the cross member 27 as best indicated in FIGURE 4 of the drawings. The locks 36 are elongated flat strips of sheet metal or the like of slightly less height than the inner diameter of the cross member 27. An ear 37 is provided near one end of the lock 36 which projects downwardly through the slots 29. A downwardly projecting arm 39 is provided near the opposite or inner end of each of the locks 36 to also extend through the slots 29. The arms 39 include lateral portions 40 and downwardly projecting handle portions 41 thereupon. The handle portions 41 are preferably provided with right angularly bent flanges 42 which form bearing plates so that the two locks may be grasped between the fingers and drawn together.

A spring 43 is interposed between the two locks 36 and is held in place by projecting ears 44 on the inner ends of the locking members. Outwardly projecting latching portions 45 are provided on the outer ends of the locks 36, the projections 45 including a flat upper surface 46, a downwardly and outwardly inclined cam portion 47 and a flat horizontal locking portion 49 facing downwardly.

Each of the locks 36 also includes an upwardly projecting ear 50 which rides in a short slot 51 in each end of the cross member 27 in diametrically opposed relation to the slot 29. The engagement of the ears 37 and 50 in the opposed slots holds the locks from rotation.

The locks 36 are held engaged in the tubular cross member 27 by a bearing plate 52 which is arcuate in cross section to fit the curvature of the inner surface of the cross member 27. The bearing plate 52 is slightly greater in length than the distance between the opposing inner edges of the ear 37 and arm 39. The end of the bearing plate are centrally notched as indicated at 53, the notches embracing portions of the ears 37 and arms 39. The bearing plate 52 of each lock slides along the inner surface of the cross member 27 as the locks are reciprocated.

In assembling the two leg sections 15 and 16, the upper ends of the lower tubular members 33 are inserted into lower ends of the tubular members 26. The locks 36 are manually retracted by inward pressure upon the handle portions 42. The lower leg sections may then be telescoped to the desired extent into the tubular portions of the upper leg sections.

If it is necessary to raise the level of the table top, the table top is merely lifted upwardly while the lower leg section remains stationary. As the leg sections telescope apart, the cam surfaces 47 of the projecting latch portions 45 successively engage against the tongues 34. The tongues 34 combined with the cam edge 47 coact to retract the latches until the latch portions engage in the next notch formed by the inwardly bent ears 34. This action continues until the legs telescope apart to a maximum degree. At this point, the latch projection extends into the notch formed by the inbent ear 35. As this ear 35 is bent inwardly at a greater angle to the vertical than the ears 34, the latch projections 45 may extend to a greater degree into the notch, permitting the flat upper surface of the latch projection 45 to engage the upper edge of the notch to prevent further withdrawal of the lower leg section. Obviously, the two sections may be completely separated when desired by retracting the locks.

In view of the fact that the projecting latch portion must engage the inner tubular members 33, notches such as 55 (FIGURE 7) are provided in the upper tubular members 26 through which these latch projections may extend.

In accordance with the patent statutes, I have described the principles of construction and operation of my improvement in adjustable leg units, and while I have endeavored to set forth the best embodiment thereof, I desire to have it understood that changes may be made within the scope of the following claims without departing from the spirit of my invention.

I claim:

1. An adjustable leg unit including an upper section and a lower section, the upper section including a pair of parallel upper tubular members, a tubular connecting member connecting said parallel upper tubular members near the lower ends thereof, the lower section including a pair of parallel connected lower tubular members in telescoping relation to the upper tubular members, vertically spaced notches in said lower tubular members in the inner opposed edges thereof, said tubular connecting member having a slot extending longitudinally thereof, a pair of flat locks slidably supported in said connecting member, said locks having projecting outer latch ends extending through said upper tubular members and engageable into the notches of the lower tubular members, downwardly projecting handle arms on the inner ends of said locks extending through said slot, spring means between said locks urging them apart, upwardly projecting ears on said locks, said cross member having short second slots in diametrically opposed relation to said first named slot through which said ears extend, said ears being engageable with the ends of said short slots to limit movement of said locks toward one another, and means for retaining said locks in said connecting member.

2. The construction described in claim 1 and in which said ears are adjacent to said outer latch ends of said locks.

3. The structure of claim 2 and in which said short slots are in the end portions of the connecting member.

4. The structure of claim 1 and including downwardly projecting ears on said locks adjoining said latch ends extending through said first mentioned slot.

5. The structure of claim 4 and in which said means for retaining said locks in said connecting member comprise plates within said connecting member and engaged between said downwardly projecting ears and said handle arms, said plates spanning the edges of said first named slot.

6. A lock for use in holding a pair of tubular members in adjusted telescoping relation and in combination therewith, the lock including a tubular support connected to the outer of said telescoping members and extending in substantially right angular relation thereto, a slot extending longitudinally of said tubular support, a lock member slidably supported for movement axially of said support, the inner of said tubular members having a series of longitudinally spaced notches therein registrable with an end of said lock member, said outer tubular member having an aperture therethrough registrable with said notches and through which said end of said lock member may extend for engagement into a selected notch of said inner tubular member, means normally urging said lock toward said notches, said tubular support having a short slot in diametrically opposed relation to said first slot, said lock member comprising a flat strip of sheet metal having means on opposite sides thereof projecting through said slots to prevent twisting of the lock member in said support, the means projecting through one of said slots including handle means, and including means for holding said locking member in said support.

7. The structure of claim 6 and in which said means projecting through said slot include a pair of spaced downwardly projecting means, and in which said means holding said locking member in said support includes a bearing plate spanning the edges of said first named slot and engaged between said downwardly projecting means and engaging the inner surface of said support.

References Cited in the file of this patent

UNITED STATES PATENTS

| | | |
|---|---|---|
| 872,498 | Cleveland | Dec. 3, 1907 |
| 1,177,069 | Verow et al. | Mar. 28, 1916 |
| 1,576,034 | Butt | Mar. 9, 1926 |
| 2,775,497 | Alvarez | Dec. 25, 1956 |
| 2,875,007 | Fox | Feb. 24, 1959 |